(12) United States Patent
Tsuzuki

(10) Patent No.: US 8,018,532 B2
(45) Date of Patent: Sep. 13, 2011

(54) VIDEO SIGNAL PROCESSING APPARATUS AND METHOD, AND EDGE ENHANCEMENT APPARATUS AND METHOD

(75) Inventor: Takeru Tsuzuki, Yokohama (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 1262 days.

(21) Appl. No.: 11/699,644

(22) Filed: Jan. 30, 2007

(65) Prior Publication Data

US 2007/0177060 A1    Aug. 2, 2007

(30) Foreign Application Priority Data

Feb. 2, 2006   (JP) ................................ 2006-025982
Apr. 3, 2006   (JP) ................................ 2006-101359

(51) Int. Cl.
    *H04N 5/14*   (2006.01)
(52) U.S. Cl. ........................................ 348/625; 382/266
(58) Field of Classification Search .................. 348/625; 382/266
    See application file for complete search history.

(56) References Cited

U.S. PATENT DOCUMENTS

| | | | | |
|---|---|---|---|---|
| 3,980,819 | A * | 9/1976 | Schwartz ....................... | 348/625 |
| 5,926,577 | A * | 7/1999 | Kasahara et al. ............ | 382/266 |
| 2002/0135702 | A1* | 9/2002 | Yamaki ........................ | 348/625 |
| 2006/0028541 | A1* | 2/2006 | Haraguchi ..................... | 348/27 |

FOREIGN PATENT DOCUMENTS

| | | | | |
|---|---|---|---|---|
| JP | 2000-244775 | 9/2000 | ...................... | 5/208 |
| JP | 2002-290773 | 10/2002 | ...................... | 5/208 |
| JP | 2004-194044 | 7/2004 | ...................... | 5/208 |

* cited by examiner

*Primary Examiner* — Jefferey Harold
*Assistant Examiner* — Mustafizur Rahman
(74) *Attorney, Agent, or Firm* — Renner, Kenner, Greive, Bobak, Taylor & Weber

(57) ABSTRACT

Levels of an input video signal are detected at successive pixels. An absolute level difference is produced that is an absolute value of the difference at each pixel pair. One absolute difference is applied nonlinear processing to be subtracted from an initial value to obtain a subtracted value. An absolute value of the subtracted value is set to a predetermined value if not larger than this value. The absolute difference is obtained from a pixel pair located in the middle of the pixels. The absolute value subjected to the nonlinear processing is added to the remaining absolute differences, to obtain an evaluation value. The input signal is subjected to low-pass filtering, thus video signals being output with high-frequency components attenuated depending on filter characteristics. The input signal with no filtering applied or one of the signals applied the filtering is selected for edge enhancement depending on the evaluation value.

13 Claims, 7 Drawing Sheets

VIDEO SIGNAL PROCESSING APPARATUS AND METHOD, AND EDGE ENHANCEMENT APPARATUS AND METHOD

CROSS-REFERENCE TO RELATED APPLICATIONS

This application is based on and claims the benefit of priority from the prior Japanese Patent Application No. 2006-025982 filed on Feb. 2, 2006 and No. 2006-101359 filed on Apr. 3, 2006, the entire contents of which are incorporated herein by reference.

BACKGROUND OF THE INVENTION

The present invention relates to a video signal processing apparatus, a video signal processing method, an edge enhancement apparatus, and an edge enhancement method.

Televisions are equipped with an edge enhancement circuit to increase image sharpness. The most popular technique for edge enhancement is to produce second-order differential signals from a video signal, apply amplitude adjustments to the differential signals, and add the amplitude-adjusted differential signals to the video signal. The resultant video signal has steeper edge portions with overshoot and undershoot, thus apparently having increased sharpness.

Edge enhancement with a second-order differential signal with a large peak-to-peak amplitude (with no amplitude adjustments) excessively enhances a steeper edge portion, resulting in lowered image quality. Images that suffer lowered quality most are those with symbols, letters, thin lines, etc., and on-screen displays (OSD).

There are two known techniques to overcome such a problem. One is to limit second-order differentials signal at a certain level to avoid excessive edge enhancement (disclosed, for example, in Japanese Unexamined Patent Publication No. 2002-290773, referred to as document 1, hereinafter). The other is, that, when a second-order differential signal produced from a video signal at a target pixel reaches or exceeds a reference level, second-order differential signals from the target pixel and several pixels adjacent thereto are cancelled which otherwise be added to the video signal at the target pixel, thus no overshoots being is applied (disclosed, for example, in Japanese Unexamined Patent Publication No. 2000-244775, referred to as document 2, hereinafter).

Another problem to lower image quality is variation in the intermediate gradation level of images with monotonous increase or decrease in gradation per vertically adjacent two lines, such as symbols and letters in an electronic program guidance (EPG) in digital broadcast, when edge enhancement is applied. This problem may be solved by adding video signals at vertically adjacent two lines and averaging the added signals (disclosed, for example, in Japanese Unexamined Patent Publication No. 2004-194044, referred to as document 3, hereinafter).

The above-discussed OSDs with symbols, letters, etc., having sharpened edges are mostly shown in high-vision equipment, such as, D-VHS (a registered trademark) digital VTR (Video Tape recorders), HDD (Hard Disc Drive)/DVD (Digital Versatile Disc) recorders equipped with a high-vision tuner, etc.

Edge enhancement on OSDs with symbols, letters, etc., having sharpened edges causes thicker edges, ringing, etc. The techniques described above are still not enough for edge enhancement on the OSDs.

In detail, limitation of second-order differential signals at a certain level in the document 1 could diminish the effects of edge enhancement on images displayed with an OSD. Cancellation of second-order differential signals at a target pixel and pixels adjacent thereto in an OSD in the document 2 in which edge enhancement is on or off per pixel, could cause discontinuity in the spatial domain or noises when it is on or off in the temporal domain. Moreover, addition of video signals at vertically adjacent two lines and averaging the added signals in the document 3 could cause the same problem as the document 2 due to filtering per vertically adjacent two lines.

Problems related to edge enhancement on OSDs with the techniques described above are further discussed.

Natural images suffer noises when photographed. In contrast, digitally produced OSDs suffer almost no noises, in addition, reach a monitor with completely no noises when supplied through HDMI digital transfer. The HDMI (High-Definition Multimedia Interface) provides high-definition and noiseless video signals, in compliance with the specifications for baseband digital video/audio input/output interface.

Basically, OSDs offer sharpened letters or symbols having steep edges, with no edge enhancement. It is thus better to display images on screen with no edge enhancement if the images are noiseless and already have steep edges.

For such OSDs, the known techniques have the following disadvantages:

Limitation of second-order differential signals at a certain level in the document 1 could diminish the effects of edge enhancement on steep edge portions only in an OSD while the effects remains overall which produce blurry background displays to OSD letters, symbols, etc.

Cancellation of second-order differential signals at a target pixel and pixels adjacent thereto in the document 2 cancels edge enhancement on overshoot portions of a video signal while the effects remain on undershoot portions, thus effective only on edge portions having a large peak-to-peak amplitude. Moreover, having edge enhancement on or off per pixel in the document 2 could cause that it is off on the image portions to which this effect should be applied.

SUMMARY OF THE INVENTION

A purpose of the present invention is to provide a video signal processing apparatus, a video signal processing method, an edge enhancement apparatus, and an edge enhancement method which provide clear OSDs or displays of images having steep edges.

The present invention provides a video signal processing apparatus for edge enhancement comprising: a signal level detector to detect signal levels of an input video signal at an N number of pixels located adjacent to one another in a specific scanning direction, N being an even number of four or larger; an absolute value producer to obtain a difference between the signal levels and produce an absolute difference that is an absolute value of the difference at each pair of adjacent two pixels among the N number of pixels, thus obtaining an (N−1) number of absolute differences; a nonlinear arithmetic processor to apply nonlinear arithmetic processing to a particular one absolute difference among the (N−1) number of absolute differences to subtract the particular one absolute difference from a predetermined initial value to obtain a subtracted value, and to obtain an absolute value of the subtracted value, the absolute value of the subtracted value being set to a predetermined value if equal to or lower than the predetermined value, the particular one absolute difference being obtained from a pixel pair of two adjacent pixels located in the middle of the N number of pixels aligned in the specific scanning direction; an adder to add the absolute value of the subtracted value subjected to the nonlinear arithmetic processing and an (N−2) number of absolute differences among the (N−1) number of absolute differences, the (N−2) number of absolute differences being not subjected to the nonlinear arithmetic processing, thus obtaining an evaluation function value; a plurality of low-pass filters having different filter characteristics for applying filtering processing to the input video signal, thus outputting video signals having high-frequency components attenuated depending on the different filter characteristics; and a selector to select the input video signal with no filtering processing applied for the edge enhancement if the evaluation function value is larger than a reference value whereas one of the video signals output from the low-pass filters for the edge enhancement if the evaluation function value is equal to or smaller than the reference value, the smaller the evaluation function value, selected being one of the video signals having the high-frequency components attenuated more.

Moreover, the present invention provides an edge enhancement apparatus comprising: a signal level detector to detect signal levels of an input video signal at an N number of pixels located adjacent to one another in a horizontal scanning direction, N being an even number of four or larger; an absolute value producer to obtain a difference between the signal levels and produce an absolute difference that is an absolute value of the difference at each pair of adjacent two pixels among the N number of pixels, thus obtaining an (N−1) number of absolute differences; a comparator to compare each of the (N−1) number of absolute differences with a first reference value and a second reference value larger than the first reference value, and output a first value if each absolute difference is smaller than the first reference value, a second value if each absolute difference is equal to or larger than the first reference value but smaller than the second reference value, and a third value if each absolute difference is equal to or larger than the second reference value, the first, second and third values being different from one another; a pattern recognizer to detect whether output values of the comparator for the (N−1) number of absolute differences have at least a pattern of "the first value", "the third value" and "the first value" aligned in order when the output values are aligned in the horizontal scanning direction in which the N number of pixels are aligned, thus outputting a first control signal when the output values are recognized as having the pattern whereas a second control signal different from the first control signal when the output values are recognized as not having the pattern, the first or the second control signal being output for a period of transferring the input video signal by the N number of pixels; and an edge enhancer, responsive to the first or the second control signal, to produce an edge enhancing component based on the input video signal and add the edge enhancing component to the input video signal, thus outputting an edge-enhanced video signal when the first control signal is supplied whereas outputting the input video signal without adding the edge enhancing component when the second control signal is supplied.

Moreover, the present invention provides a video signal processing method for edge enhancement comprising the steps of: detecting signal levels of an input video signal at an N number of pixels located adjacent to one another in a specific scanning direction, N being an even number of four or larger; obtaining a difference between the signal levels and producing an absolute difference that is an absolute value of the difference at each pair of adjacent two pixels among the N number of pixels, to obtain an (N−1) number of absolute differences; applying nonlinear arithmetic processing to a particular one absolute difference among the (N−1) number of absolute differences to subtract the particular one absolute difference from a predetermined initial value to obtain a subtracted value, and to obtain an absolute value of the subtracted value, the absolute value of the subtracted value being set to a predetermined value if equal to or lower than the predetermined value, the particular one absolute difference being obtained from a pixel pair of two adjacent pixels located in the middle of the N number of pixels aligned in the specific scanning direction; adding the absolute value of the subtracted value subjected to the nonlinear arithmetic processing and an (N−2) number of absolute differences among the (N−1) number of absolute differences, the (N−2) number of absolute differences being not subjected to the nonlinear arithmetic processing, to obtain an evaluation function value; applying low-pass filtering processing to the input video signal with different filter characteristics to obtain video signals having high-frequency components attenuated depending on the different filter characteristics; and selecting the input video signal with no low-pass filtering processing applied for the edge enhancement if the evaluation function value is larger than a reference value whereas one of the video signals applied the low-pass filtering processing for the edge enhancement if the evaluation function value is equal to or smaller than the reference value, the smaller the evaluation function value, selected being one of the video signals having the high-frequency components attenuated more.

Furthermore, the present invention provides an edge enhancement method comprising the steps of: detecting signal levels of an input video signal at an N number of pixels located adjacent to one another in a horizontal scanning direction, N being an even number of four or larger; obtaining a difference between the signal levels and producing an absolute difference that is an absolute value of the difference at each pair of adjacent two pixels among the N number of pixels, to obtain an (N−1) number of absolute differences; comparing each of the (N−1) number of absolute differences with a first reference value and a second reference value larger than the first reference value, and outputting a first value if each absolute difference is smaller than the first reference value, a second value if each absolute difference is equal to or larger than the first reference value but smaller than the second reference value, and a third value if each absolute difference is equal to or larger than the second reference value, the first, second and third values being different from one another; detecting whether output values of the comparison for the (N−1) number of absolute differences have at least a pattern of "the first value", "the third value" and "the first value" aligned in order when the output values are aligned in the horizontal scanning direction in which the N number of pixels are aligned, to output a first control signal when the output values are recognized as having the pattern whereas a second control signal different from the first control signal when the output values are recognized as not having the pattern, the first or the second control signal being output for a period of transferring the input video signal by the N number of pixels; and producing an edge enhancing component based on the input video signal and adding the edge enhancing component to the input video signal, to obtain an edge-enhanced video signal when the first control signal is supplied whereas obtain the input video signal without adding the edge enhancing component when the second control signal is supplied.

DETAILED DESCRIPTION OF PREFERRED EMBODIMENTS

Described first is a preferred embodiment of a video signal processing apparatus according to the present invention.

Figure 1:
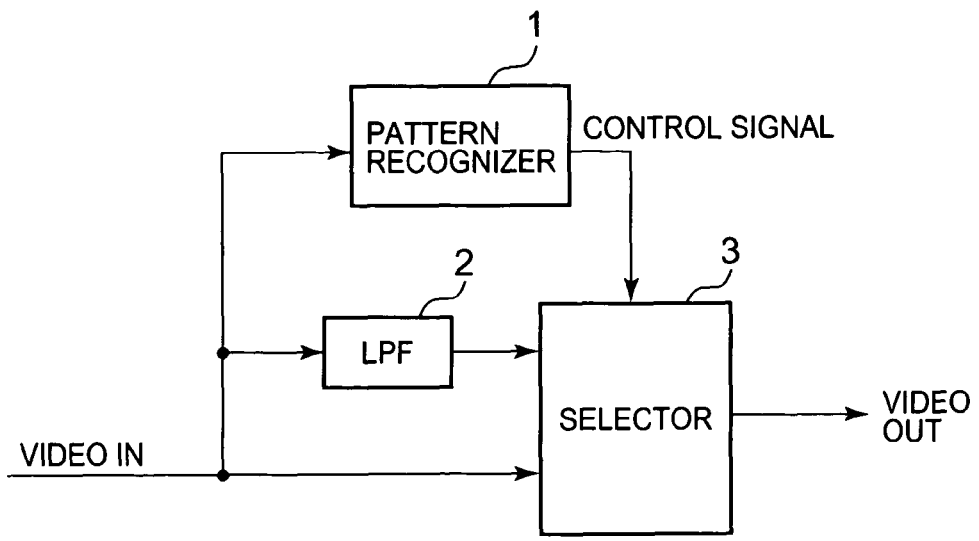
FIG. 1 shows a block diagram of an embodiment of a video signal processing apparatus according to the present invention.

FIG. 1 shows a block diagram of an embodiment of a video signal processing apparatus according to the present invention.

An input video signal is supplied to a pattern recognizer 1 for pattern recognition processing which will be described later. The input video signal is also supplied to a low-pass filter (LPF) 2 for attenuating a high-frequency component at or higher than a given cut-off frequency. The input video signal may be a luminance signal or an RGB signal.

The input video signal is also supplied to a selector 3. Selected by the selector 3 is either the input video signal or the output of the LPF 2, a high-frequency-component-attenuated video signal.

Figure 2:
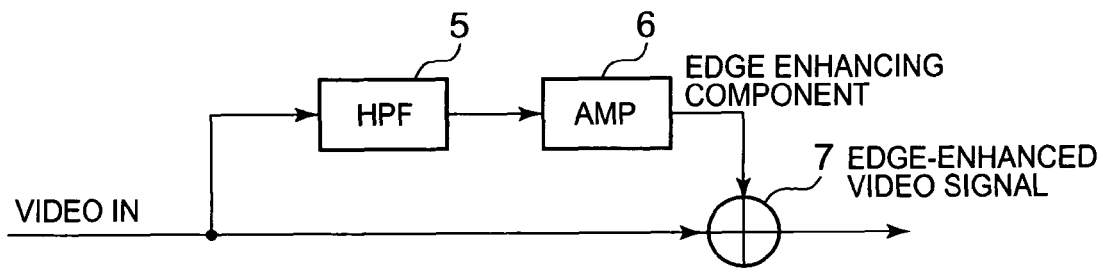
FIG. 2 shows a block diagram of a known edge enhancer.

An output video signal of the selector 3 is then supplied to an edge enhancer, for example, shown in FIG. 2. The video signal is supplied to a high-pass filter (HPF) 5. Output from the HPF 5 is a second-order differential signal which is then supplied to an amplifier (AMP) 6 for amplitude adjustments. The amplitude-adjusted second-order differential signal (an edge enhancing component) is supplied to an adder 7. Also supplied to the adder 7 is the output video signal of the selector 3 (FIG. 1). The adder 7 adds the both signals to output an edge-enhanced video signal.

The pattern recognizer 1 shown in FIG. 1 recognizes the input video signal with evaluation function which indicates how the input video signal is similar to an OSD signal and controls the selector 3 according to the evaluation function.

It is then crucial in this invention to provide evaluation function that matches an OSD signal.

Features of an OSD signal, a digital video signal, are a very steep change in luminance and almost no noises. Natural images are subjected to LPF processing when photographed or transferred. In contrast, digitally produced OSDs for which an image is produced per dot require no LPF processing, thus having steep edges. In addition, natural images suffer noises when photographed. On the contrary, OSDs produced in digital equipment suffer almost no noises, in addition, reach a monitor without noises when supplied through HDMI digital transfer.

Figure 3:
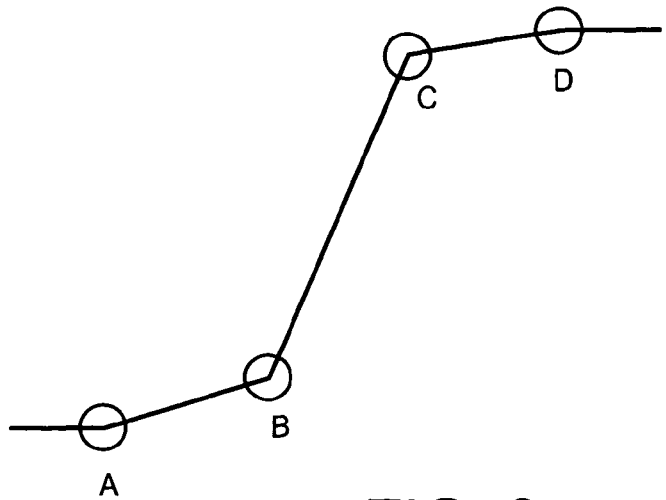
FIG. 3 shows an illustration explaining evaluation function used in the video signal processing apparatus according to the present invention.

Discussed with reference to FIG. 3 is evaluation function for OSDs with steep change in luminance and almost no noises.

Illustrated in FIG. 3 are signal levels A, B, C and D at four pixels that are located adjacent to one another in the spatial domain. An evaluation function for the pixels is given by $|A-B|+|C-D|+f(INT-|B-C|)$. The term $|A-B|$ is an absolute value of a difference in signal level between A and B. The same is applied to $|C-D|$ and $|B-C|$. The sign INT is an initial value. The sign f( ) is a function that gives zero or an upper value to $INT-|B-C|$. Any value below zero is replaced with zero by the function f( ).

The pattern recognizer 1 (FIG. 1) determines that, as the evaluation function is smaller, an input video signal carries an edge portion having a steeper luminance change similar to an edge portion of an OSD having a step-like change in luminance.

The initial value INT is a reference value corresponding to a step-like varying level of an input video signal. When the initial value is 40, the function f( ) gives zero to any edge level of 40 or larger given by $|B-C|$.

Accordingly, the evaluation function described above offers accurate detection of a steep edge portion of an image, like digitally produced OSD having a steep change in luminance and almost no noises.

Figure 4:
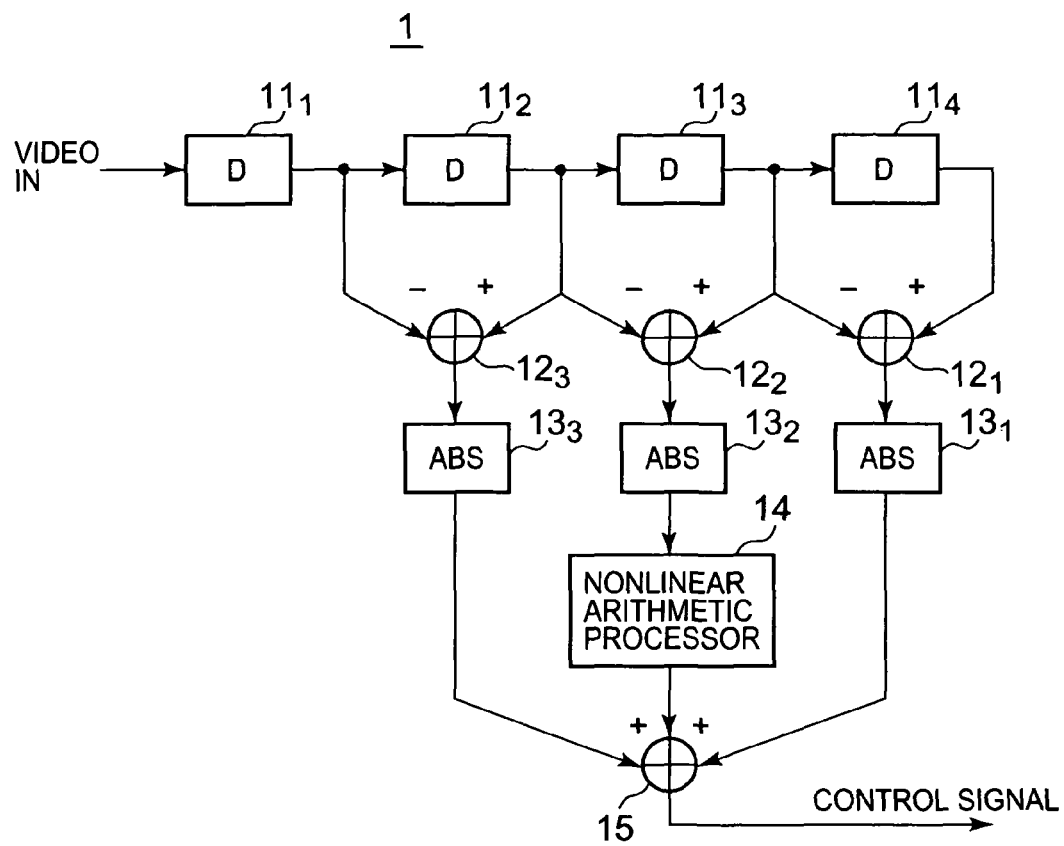
FIG. 4 shows an exemplary block diagram of a pattern recognizer in the video signal processing apparatus according to the present invention.

FIG. 4 shows an exemplary block diagram of the pattern recognizer 1 (FIG. 1).

As shown in FIG. 4, the pattern recognizer 1 is equipped with: four series-connected delay circuits (D) $11_1$, $11_2$, $11_3$ and $11_4$; subtractors $12_1$, $12_2$, and $12_3$; absolute value output circuits (ABS) $13_1$, $13_2$, and $13_3$; a nonlinear arithmetic processor 14; and an adder 15.

An input video signal is supplied to the delay circuits $11_1$, $11_2$, $11_3$ and $11_4$ and delayed by each delay circuit for a period required for transferring the video signal by one pixel, thus a signal level at each pixel being detected. The delay circuits $11_1$, $11_2$, $11_3$ and $11_4$ function as a signal level detector.

A signal level of an output delayed video signal of the delay circuit $11_3$ is subtracted from that of the circuit $11_4$ at the subtractor $12_1$. A signal level of an output delayed video signal of the delay circuit $11_2$ is subtracted from that of the circuit $11_3$ at the subtractor $12_2$. A signal level of an output delayed video signal of the delay circuit $11_1$ is subtracted from that of the circuit $11_2$ at the subtractor $12_3$.

Output signals of the subtractors $12_1$, $12_2$ and $12_3$ are processed by the absolute value output circuits $13_1$, $13_2$, and $13_3$, respectively. Output from the circuits $13_1$, $13_2$, and $13_3$ are $|C-D|$, $|B-C|$ and $|A-B|$, respectively, which are absolute differences between signal levels C and D, B and C, and A and B, respectively, at the four pixels that are located adjacent to one another in the spatial domain, as shown in FIG. 3. The subtractors $12_1$, $12_2$ and $12_3$, and the absolute value output circuits $13_1$, $13_2$, and $13_3$ function as an absolute value producer.

The output $|B-C|$ of the absolute value output circuit $13_2$ is supplied to the nonlinear arithmetic processor 14 for nonlinear arithmetic processing to gain a function $f(INT-|B-C|)$, as discussed above.

The function $f(INT-|B-C|)$ is supplied to the adder 15. Also supplied to the adder 15 are the outputs $|C-D|$ and $|A-B|$ of the absolute value output circuits $13_1$ and $13_3$, respectively.

The adder 15 adds these values and outputs a control signal carrying an evaluation function to the selector 3 (FIG. 1) for signal selection.

In detail, the selector 3 is controlled so that it selects a signal from the LPF 2 having a "strong" low-pass filter (LPF) characteristics when the calculated evaluation function is smaller than a reference value (which will be discussed later). This is based on the fact that, as the evaluation function is smaller, an input video signal carries an edge portion having a steeper luminance change similar to an edge portion of an OSD having a step-like steep change in luminance, as discussed above. Regarding the LPF characteristics, as the LPF 2 has a "stronger" LPF characteristics, the frequency at which an input signal begins to be attenuated is a lower-range frequency.

Figure 5:
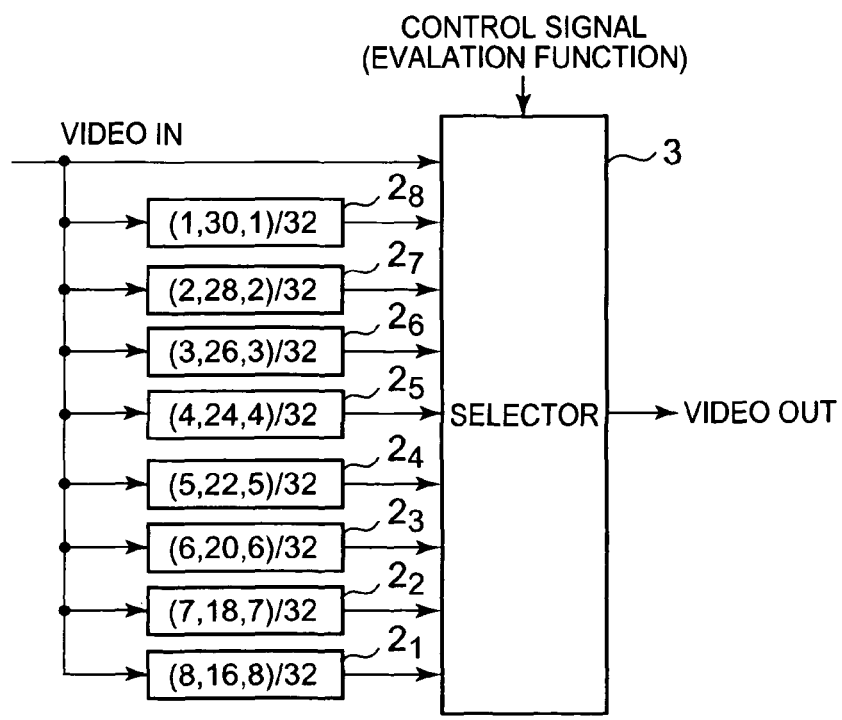
FIG. 5 shows an exemplary block diagram of a low-pass filter connected to a selector in the video signal processing apparatus according to the present invention.

FIG. 5 shows an exemplary block diagram of the LPF 2 connected to the selector 3 shown in FIG. 1.

In FIG. 5, the LPF 2 consists of eight low-pass filters (LPF) $2_1$, $2_2$, $2_3$, $2_4$, $2_5$, $2_6$, $2_7$ and $2_8$ with different LPF characteristics. The LPF $2_1$ has the "strongest" LPF characteristics with which high-frequency components are attenuated most. The frequency range is higher in the order of $2_2$, $2_3$, . . . . Then, the LPF $2_8$ has the "weakest" LPF characteristics with which high-frequency components are attenuated least.

Indicated in each block of the eight LPF $2_1$ to $2_8$ is a tap coefficient. The LPF $2_1$ is given tap coefficients of (8, 16, 8)/32. With the tap coefficients, the LPF $2_1$ produces an output of (8×A+16×B+8×C)/32 for signal levels A, B and C at three pixels adjacent to one another. The LPF $2_8$ with tap coefficients of (1, 30, 1)/32 produces an output of (1×A+30×B+1×C)/32 for such three continuous pixels. The same is true for the other LPFs.

The LPF $2_1$ having the strongest LPF characteristics attenuates the widest-range of high frequency components of an input video signal, thus outputting a video signal with the most moderate edge, among the eight LPFs.

Figure 6:
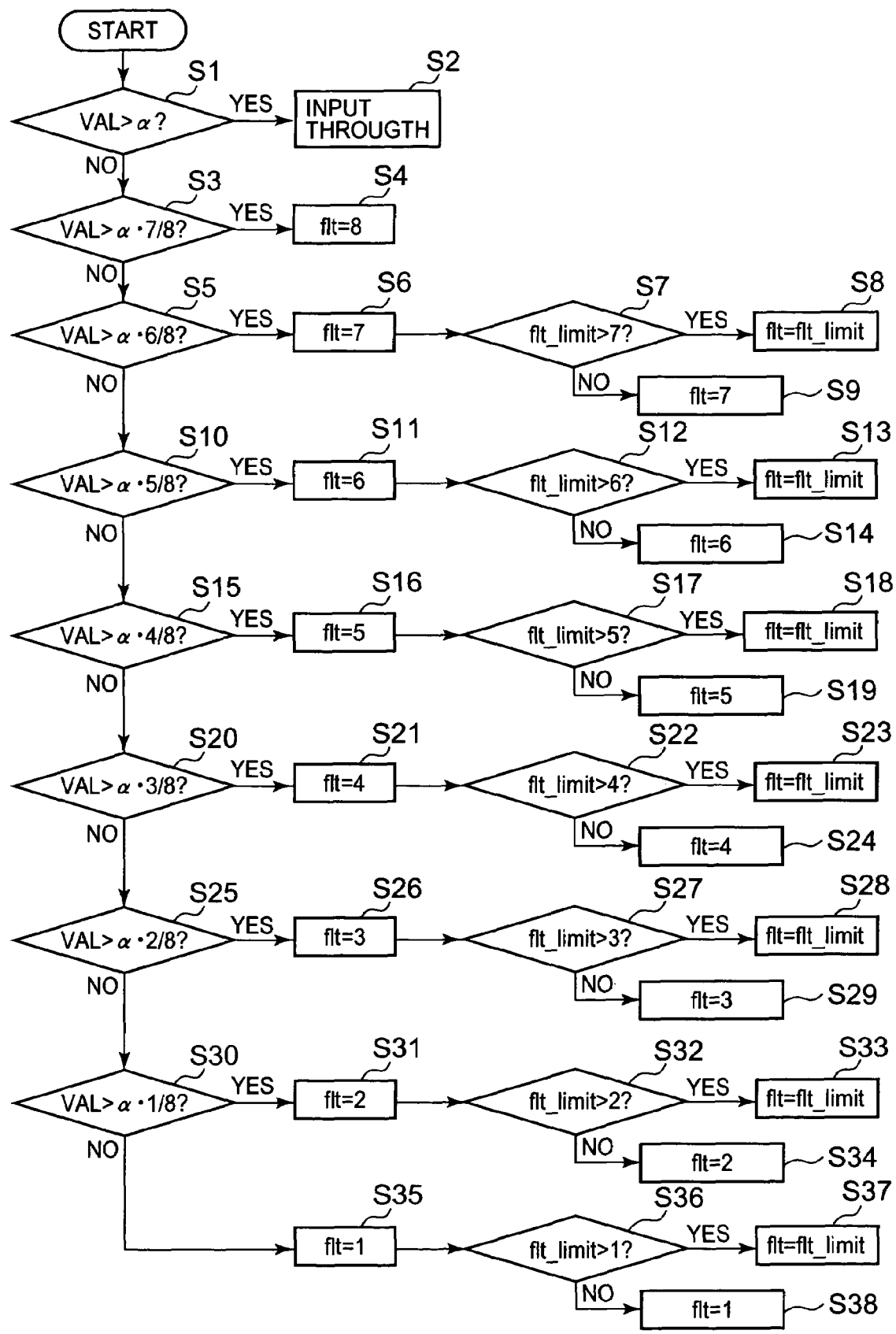
FIG. 6 shows a flow chart explaining the operation of the selector in the video signal processing apparatus according to the present invention.

The operation of the selector 3 (FIG. 5) is described with respect to a flow chart shown in FIG. 6.

The signals supplied to the selector 3 are: the input video signal to be processed; eight video signals from the LPF $2_1$ to $2_8$ that are the input video signal subjected to filtering with the eight types of LPF characteristics discussed above; and the control signal from the pattern recognizer 1, carrying the evaluation function for the input video signal.

It is determined in step S1 whether a value VAL of the evaluation function is larger than an upper limit value "a" preset in the selector 3. The value "a" is the upper limit of the evaluation function with which an input video signal is determined as a signal having a steep edge, like an OSD signal and hence should be filtered.

If YES or VAL>a in step S1, the input video signal is selected and passes through the selector 3 in step S2 under determination that the waveform of the input video signal (without processed by the LPF 2) is not steep. In contrast, If NO or VAL≦a in step S1, the value VAL is compared with a value gained by multiplying "a" by ⅞ in step S3.

If YES or VAL>a·⅞ in step S3, a variable "flt" is set to "8" at the selector 3 in step S4 under determination that the input video signal waveform is not so steep. With this variable setting, a video signal output from the LPF $2_8$ having high-frequency components suppressed a little is selected and passes through the selector 3.

The variable "flt" can be set in the range from 1 to 8 in this embodiment, the larger the variable "flt", the weaker the LPF characteristics being selected (the smaller the effectiveness of filtering), or wider-range of high-frequency components being not attenuated.

In contrast, If NO or VAL≦a·⅞ in step S3, the value VAL is compared with a value gained by multiplying "a" by ⅚ in step S5.

If YES or VAL>a·⅚ in step S5, the variable "flt" is set to "7" in step S6 under determination that the input video signal waveform is not so steep. Determined next in step S7 is whether a value "flt_limit" also set in the selector 3 is larger than "7" set in step S6.

The value "flt_limit" is used in limiting the effectiveness of filtering processing, the larger the value "flt_limit", the weaker the LPF characteristics being selected (the smaller the effectiveness of filtering), or wider-range of high-frequency components being not attenuated. It can be varied by a user while observing the effectiveness of filtering to an OSD or an OSD-like image on screen.

If YES or flt_limit>7 in step S7, the variable "flt" is set to the value of "flt_limit" in step S8. This is because the upper limit of the effectiveness of filtering set by the user is smaller than the effectiveness at "flt" of "7", or the effectiveness of filtering at "flt" set in step S6 exceeds the limiting value "flt_limit".

In contrast, If NO or flt_limit≦7 in step S7, the variable "flt" set to "7" in step S6 remains unchanged in step S9. This is because the upper limit of the effectiveness of filtering set by the user is equal to or larger than the effectiveness at "flt" of "7", or the effectiveness of filtering at "flt" set in step S6 does not exceed the limiting value "flt_limit".

The selector 3 selects one of the eight outputs of the LPF $2_1$ to $2_8$ depending on the variable "flt" set in step S8 or S9. For example, when "flt" is set to "7", the selector 3 selects and outputs a video signal from the LPF 27 having high-frequency components suppressed a little.

On the contrary, if NO or VAL≦a·⅚ in step S5, it is determined in step S10 whether the evaluation function value VAL is larger than a ⅝.

If YES or VAL>a·⅝ in step S10, the variable "flt" is set to "6" in step S11 under determination that the input video signal waveform is not so steep. Determined next in step S12 is whether the value "flt_limit" is larger than "6" set in step S11.

If YES or flt_limit>6 in step S12, the variable "flt" is set to the value of "flt_limit" in step S13 because the effectiveness of filtering at the variable "flt" set in step S11 exceeds the limiting value "flt_limit". In contrast, If NO or flt_limit≦6 in step S12, "flt" set to "6" in step S11 remains unchanged in step S14 because the effectiveness of filtering at "flt" set in step S11 does not exceed the limiting value "flt_limit".

The selector 3 selects one of the eight outputs of the LPF $2_1$ to $2_8$ depending on the variable "flt" set in step S13 or S14. For example, when "flt" is set to "6", the selector 3 selects and outputs a video signal from the LPF 26 having high-frequency components suppressed.

In the same way, the selection procedure continues as described below.

If NO or VAL≦a·⅝ in step S10, it is determined in step S15 whether the evaluation function value VAL is larger than a·⁴⁄₈. If NO or VAL≦a·⁴⁄₈ in step S15, it is determined in step S20 whether VAL is larger than a·⅜. If NO or VAL≦a·⅜ in step S20, it is determined in step S25 whether VAL is larger than a·²⁄₈. And, If NO or VAL≦a·²⁄₈ in step S25, it is determined in step S30 whether VAL is larger than a·⅛.

If YES or VAL>a·⁴⁄₈ in step S15, the variable "flt" is set to "5" in step S16; and if flt_limit>5 (YES) in step S17, "flt" is set to the value of "flt_limit" in step S18 whereas if flt_limit≦5 (NO) in step S17, "flt" set to "5" in step S16 remains unchanged in step S19.

If YES or VAL>a·⅜ in step S20, the variable "flt" is set to "4" in step S21; and if flt_limit>4 (YES) in step S22, "flt" is set to the value of "flt_limit" in step S23 whereas if flt_limit≦4 (NO) in step S22, "flt" set to "4" in step S21 remains unchanged in step S24.

If YES or VAL>a·²⁄₈ in step S25, the variable "flt" is set to "3" in step S26; and if flt_limit>3 (YES) in step S27, "flt" is set to the value of "flt_limit" in step S28 whereas if flt_limit≦3 (NO) in step S27, "flt" set to "3" in step S26 remains unchanged in step S29.

If YES or VAL>a·⅛ in step S30, the variable "flt" is set to "2" in step S31; and if flt_limit>2 (YES) in step S32, "flt" is set to the value of "flt_limit" in step S33 whereas if flt_limit≦2 (NO) in step S32, "flt" set to "2" in step S31 remains unchanged in step S34.

Moreover, if NO or VAL≦a·⅛ in step S30, the variable "flt" is set to "1" in step S35 under determination that the input video signal waveform is very steep. Determined next in step S36 is whether the value "flt_limit" is larger than "1" set in step S35.

If YES or flt_limit>1 in step S36, the variable "flt" is set to the value of "flt_limit" in step S37 because the effectiveness of filtering at the variable "flt" set in step S35 exceeds the limiting value "flt_limit". In contrast, If NO or flt_limit≦1 in step S36, "flt" set to "1" in step S35 remains unchanged in step S38 because the effectiveness of filtering at "flt" set in step S35 does not exceed the limiting value "flt_limit".

The selector 3 selects one of the eight outputs of the LPF $2_1$ to $2_8$ depending on the variable "flt" set in step S37 or S38. For example, when the variable "flt" is set to "1", the selector 3 selects and outputs a video signal from the LPF $2_1$ having high-frequency components suppressed most.

As disclosed above, in this embodiment, one of the eight outputs of the LPF $2_1$ to $2_8$ is selected and output by the selector 3 depending on the final value of the variable "flt".

If it is determined per pixel as to whether an input video signal carries a sharp image, like an OSD, an image could be displayed unnaturally with enhanced and un-enhanced zones over the screen or suffer flicker noise due to switching of enhancement per frame.

In contrast, the embodiment disclosed above achieves decrease in variations of the enhanced and un-enhanced zones in the spatial and temporal domains which could otherwise occur due to small noises, with conversion of the degree of closeness of a video signal to an OSD into numerical values VAL using evaluation function and adjustments to the effectiveness of filtering processing in several stages, such as eight stages, depending on VAL.

Figure 7:
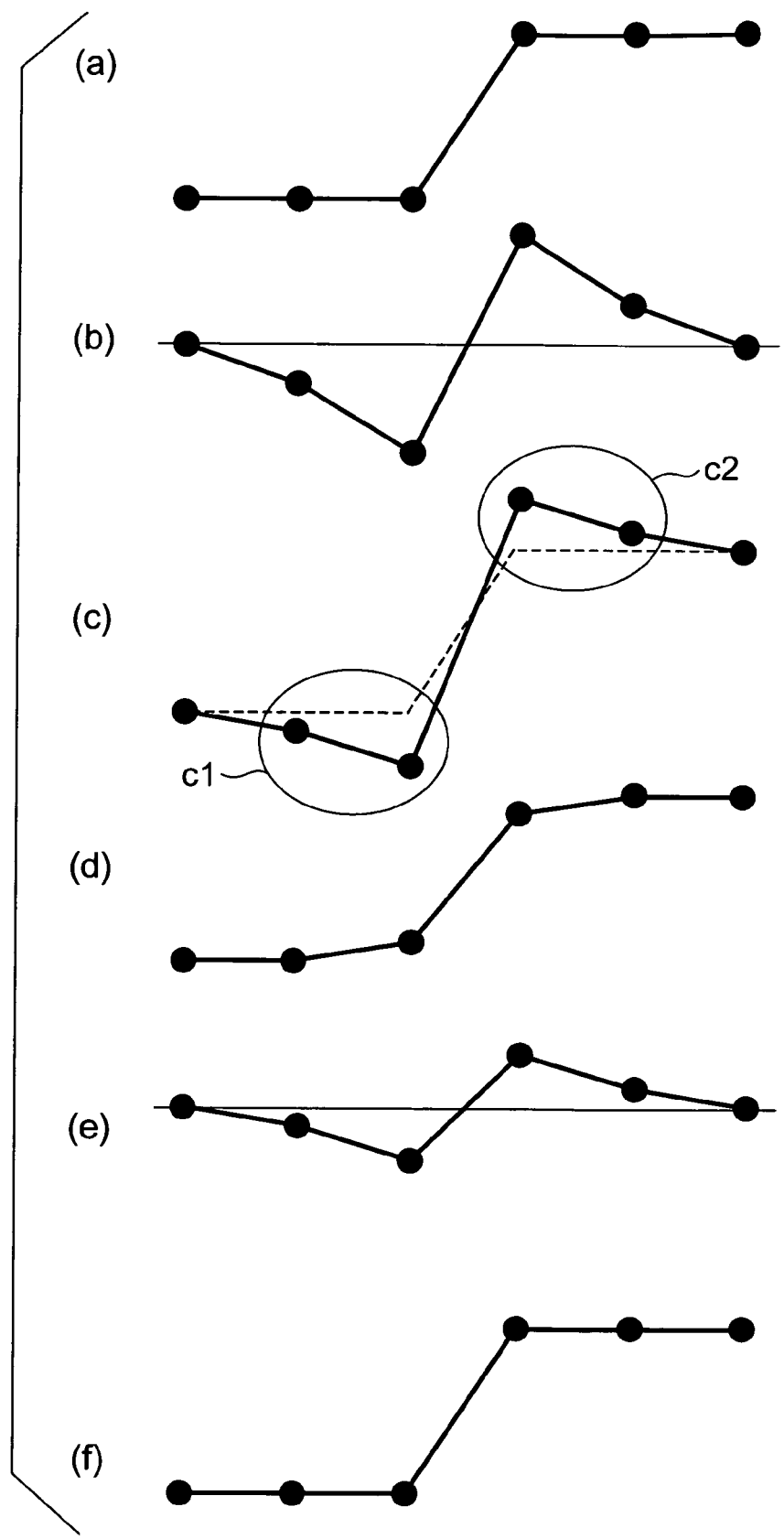
FIG. 7 shows waveforms for explaining how a video signal is processed by the video signal processing apparatus according to the present invention.

Discussed next with reference to FIG. 7 is how a video signal is processed by the above-disclosed embodiment of the video signal processing apparatus according to the present invention. Dots in FIG. 7 indicate pixels.

Illustrated in (a) of FIG. 7 is an edge portion of an input video signal to be processed having a steep waveform. When this video signal is supplied to the HPF 5 and then the AMP 6 in FIG. 2, the resultant edge enhancing component (a specific high-frequency component) has a waveform like illustrated in (b) of FIG. 7.

If the edge enhancing component in (b) of FIG. 7 is added to the input video signal in (a) of FIG. 7, like the known edge enhancement techniques, the resultant waveform has an undershoot c1 and an overshoot c2, like shown in (c) of FIG. 7. If the input video signal carries a sharp image, for example, an OSD letter, the undershoot c1 and overshoot c2 are applied the edge portions of the letter, thus causing decrease in image quality, as already discussed.

On the contrary, in the embodiment of the present invention, the input video signal shown in (a) of FIG. 7 is processed, as described with reference to FIGS. 1 to 6.

In detail, the video signal in (a) of FIG. 7 is applied the filtering processing according to the value VAL of the evaluation function at the LPF 2 and selector 3 when it is determined at the pattern recognizer 1 as a video signal with sharp edge portions like an OSD, by using the evaluation function. The degree or effectiveness of the filtering processing depends on the value VAL. The resultant filtered video signal has a moderate waveform, like illustrated in (d) of FIG. 7 having high-frequency components suppressed.

The filtered video signal like illustrated in (d) of FIG. 7 is then supplied to the edge enhancer shown in FIG. 2. The resultant edge enhancing component processed by the HPF 5 and AMP 6 has a waveform such as illustrated in (e) of FIG. 7. The component has a moderate waveform with diminished variation in amplitude of an edge portion, or in luminance, compared to that in (b) of FIG. 7. Then, the edge enhancing component is added to the input video signal at the adder 7. The resultant edge-enhanced video signal has a waveform such as illustrated in (f) of FIG. 7, very similar to the input video signal in (a) of FIG. 7.

The eight LPFs $2_1$ to $2_8$ with different LPF characteristics are provided for the LPF 2 as shown in FIG. 5. These eight LPFs employed in this embodiment meet the requirements in that variations of the enhanced and un-enhanced zones be diminished in the spatial and temporal domains. Such number of LPFs is enough for a user to select or adjust the effectiveness of the filtering processing. The number of the LPFs may be any number other than eight if it meets the above requirements.

Moreover, discussed with reference to FIG. 3 is detection of an edge portion of a video signal in the horizontal scanning direction by using the three absolute values |A−B|, |B−C| and |C−D|. These values are absolute values of differences in the signal levels A and B, B and C, and C and D, at the four pixels adjacent to one another in the horizontal scanning direction.

Not, only the four pixels, the present invention can apply the method of detecting an edge portion of a video signal discussed with reference to FIG. 3 for an N number of pixels adjacent to one another in the horizontal scanning direction, N being four or an even number larger than four.

In detail, among the N number of pixels adjacent to one another in the horizontal scanning direction, a difference in signal level is given for each pair of two adjacent pixels, and then an (N−1) number of absolute differences (absolute values of difference in signal level) are given. These are achieved at the subtractors and absolute value output circuits shown in FIG. 4.

Subtracted from the initial value INT is a particular one absolute difference among the (N−1) number of absolute differences in signal level. The particular absolute difference is obtained from a pixel pair of two adjacent pixels located in the middle of the N number of pixels aligned in the horizontal scanning direction.

Given next is an absolute value of the value obtained by subtracting the particular absolute value from the initial value INT. The given absolute value is set to a predetermined value, such as zero, depending on INT if the given absolute value is equal to or smaller than the predetermined value. This is nonlinear arithmetic processing achieved at the nonlinear arithmetic processor 14 shown in FIG. 4.

Then, the evaluation function is obtained by addition of: the absolute value subjected to the nonlinear arithmetic processing among the (N−1) number of absolute differences; and the remaining (N−2) number of absolute differences not subjected to the nonlinear arithmetic processing. This is achieved at the adder 15 shown in FIG. 4.

The circuit components, such as shown in FIG. 4, required for the processing to obtain the evaluation function for a video signal with the N number of pixels adjacent to one another in the horizontal scanning direction are: the N number of series-connected delay circuits $11_1$ to $11_N$, each for delaying the video signal for a period required for transferring the video signal by one pixel; the (N−1) number of subtractors $12_1$ to $12_{(N-1)}$; the (N−1) number of absolute value output circuits (ABS) $13_1$ to $13_{(N-1)}$; the nonlinear arithmetic processor 14; and the adder 15.

Not only in the horizontal scanning direction, the present invention can be applied to detection of an edge portion of a video signal in the vertical scanning direction, for edge enhancement.

Edge detection in the vertical scanning direction is performed as follows: Signal levels of a video signal are detected for an N number of pixels adjacent to one another in the vertical scanning direction but in the same position in the horizontal scanning direction, N being an even number of four or larger. Obtained next are an (N−1) number of absolute differences, each being an absolute value of a difference in signal level between two adjacent pixels among the N number of pixels. An edge portion is then detected using the (N−1) number of absolute differences, basically in the same manner as detected in the horizontal scanning direction, as described above.

The difference in edge detection between the horizontal scanning direction and the vertical scanning direction lies in the circuit configuration of the pattern recognizer 1. For edge detection in the vertical scanning direction, in FIG. 4, the pattern recognizer 1 is provided with: an N number of series-connected delay circuits, each for delaying an input video signal for a period required for transferring the video signal by one line of pixels located adjacent to one another in the horizontal scanning direction; an (N−1) number of subtractors; the (N−1) number of absolute value output circuits (ABS); a nonlinear arithmetic processor; and an adder, for the video signal with the N number of pixels adjacent to one another in the vertical scanning direction, N being an even number of four or larger. The subtractors, absolute value output circuits, nonlinear arithmetic processor and adder are identical to those shown in FIG. 4.

The other circuits components required for edge detection in the vertical scanning direction are identical to those shown in FIGS. 1 and 5. The video signal having an edge detected in the vertical scanning direction may also be supplied to the edge enhancer shown in FIG. 2.

The functions of the video signal processing apparatus shown in FIG. 1, in other words, the pattern recognizer 1 shown in FIG. 4, and the LPF 2 and selector 3 shown in FIGS. 5 and 6 are achieved with software programs (video signal processing programs). The programs can be installed in a computer from a storage medium or downloaded via a communications network, or preinstalled in visual equipment as firmware.

Disclosed next is an embodiment of an edge enhancement apparatus according to the present invention.

Figure 8:
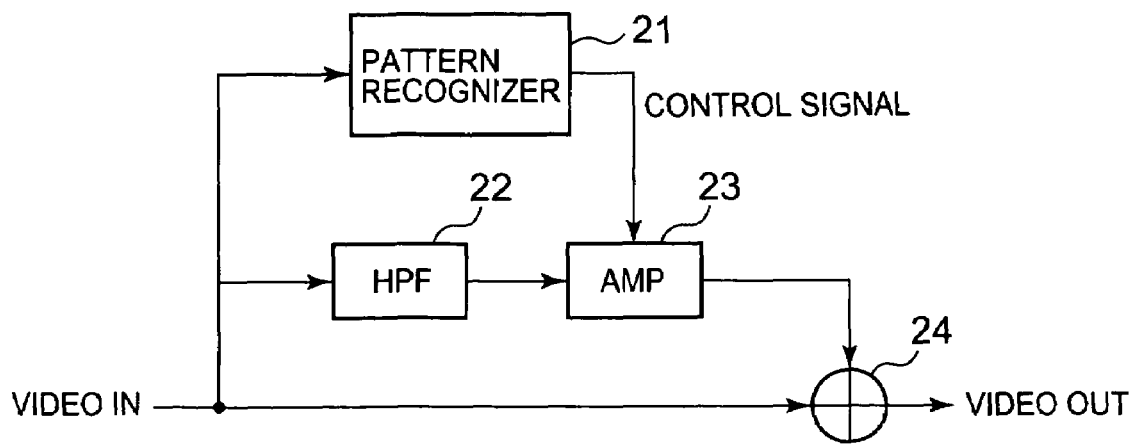
FIG. 8 shows a block diagram of an embodiment of an edge enhancement apparatus according to the present invention.

FIG. 8 shows a block diagram of the embodiment of the edge enhancement apparatus according to the present invention.

An input video signal is supplied to a pattern recognizer 21 for pattern recognition processing which will be described later and a high-pass filter (HPF) 22 for extracting a specific high-frequency component (an edge enhancing component).

The extracted high-frequency component of the video signal is supplied to an amplifier (AMP) 23 which is under control by the pattern recognizer 21 with a control signal. When the AMP 23 is on by the control signal, it amplifies the high-frequency component for amplitude adjustments. The amplitude-adjusted component is supplied to an adder 24. Also supplied to the adder 24 is the input video signal. The adder 24 adds the amplitude-adjusted component to the video signal to output an edge-enhanced video signal. When the AMP 23 is off by the control signal, the input video signal passes through the adder 24 without edge enhancement.

Figure 9:
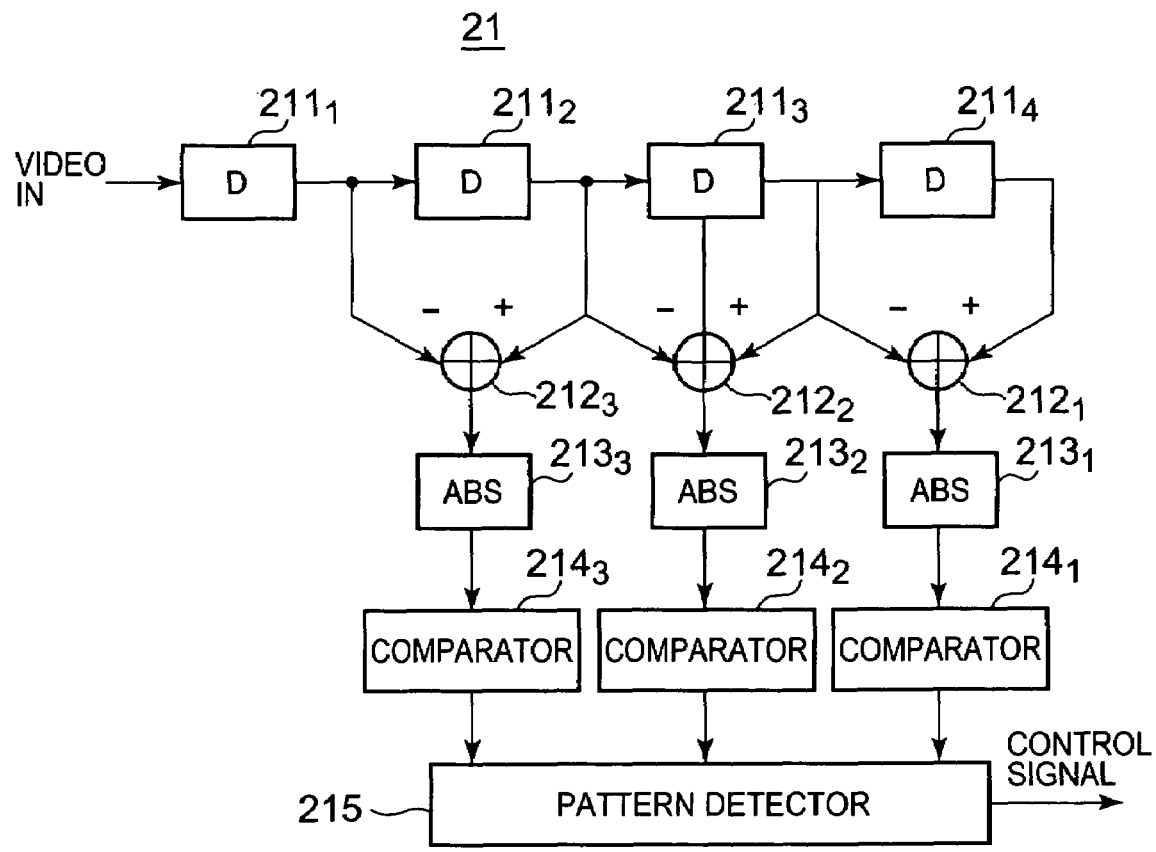
FIG. 9 shows an exemplary block diagram of a pattern recognizer in the edge enhancement apparatus according to the present invention.

FIG. 9 shows an exemplary block diagram of the pattern recognizer 21 shown in FIG. 8.

As shown in FIG. 9, the pattern recognizer 21 is equipped with: four series-connected delay circuits (D) $211_1$, $211_2$, $211_3$ and $211_4$; subtractors $212_1$, $212_2$, and $212_3$; absolute value output circuits (ABS) $213_1$, $213_2$, and $213_3$; comparators $214_1$, $214_2$, and $214_3$; and a pattern detector 215.

An input video signal is supplied to the delay circuits $211_1$, $211_2$, $211_3$ and $211_4$ and delayed by each delay circuit for a period required for transferring the video signal by one pixel, thus a signal level at each pixel being detected. The delay circuits $211_1$, $211_2$, $211_3$ and $211_4$ function as a signal level detector.

A signal level of an output delayed video signal of the delay circuit $211_3$ is subtracted from that of the circuit $211_4$ at the subtractor $212_1$. A signal level of an output delayed video signal of the delay circuit $211_2$ is subtracted from that of the circuit $211_3$ at the subtractor $212_2$. A signal level of an output delayed video signal of the delay circuit $211_1$ is subtracted from that of the circuit $211_2$ at the subtractor $212_3$.

Output signals of the subtractors $212_1$, $212_2$ and $212_3$ are processed by the absolute value output circuits $213_1$, $213_2$, and $213_3$, respectively. Output from each of the circuits $213_1$, $213_2$, and $213_3$ is an absolute difference in signal level between two adjacent pixels among four pixels adjacent to one another in the horizontal scanning direction. The subtractors $212_1$, $212_2$ and $212_3$, and the absolute value output circuits $213_1$, $213_2$, and $213_3$ function as an absolute value producer.

The absolute differences output from the absolute value output circuits $213_1$, $213_2$, and $213_3$ are supplied to the comparators $214_1$, $214_2$, and $214_3$, respectively. Each absolute difference is compared with two reference values TH1 and TH2 at the corresponding comparator, which will be described later.

The comparison results from the comparators $214_1$, $214_2$, and $211_3$ are supplied to the pattern detector 215. The detector 215 determines whether the comparison results match a specific pattern, thus outputting a control signal to the AMP 23 (FIG. 8).

The function of the pattern recognizer 21 is explained with reference to waveforms illustrated in FIG. 10 with dots indicating pixels and also a flow chart shown in FIG. 11.

Figure 10:
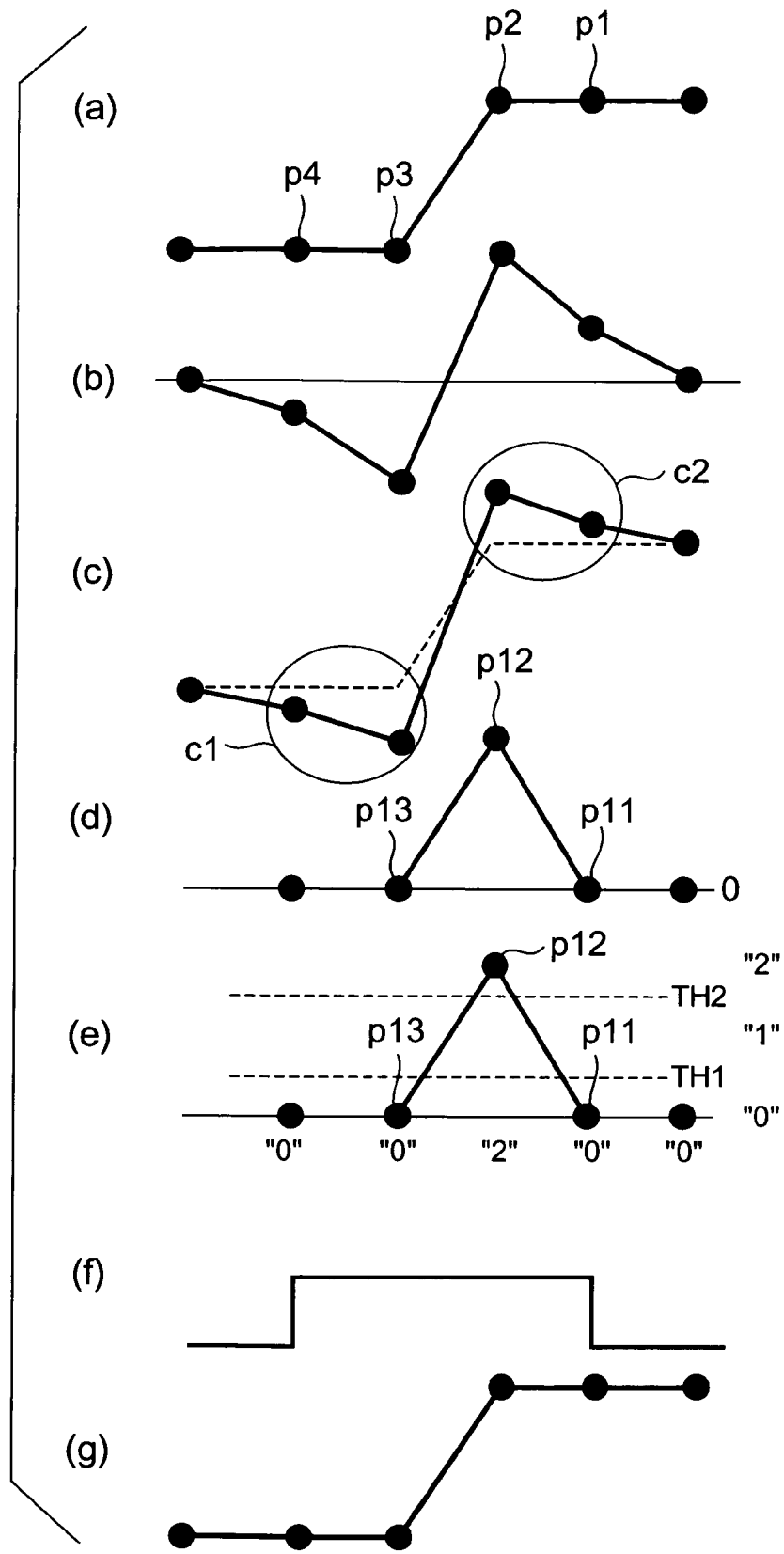
FIG. 10 shows waveforms for explaining how a video signal is processed by the edge enhancement apparatus according to the present invention.

An input video signal illustrated in (a) FIG. 10 having a rising edge is supplied to the delay circuits $211_1$, $211_2$, $211_3$ and $211_4$ and delayed by each delay circuit for a period required for transferring the video signal by one pixel.

The input video signal is also supplied to the HPF 22 which extracts a specific high-frequency component (an edge enhancing component) illustrated in (b) of FIG. 10.

If the edge enhancing component in (b) of FIG. 10 is added to the input video signal in (a) of FIG. 10, like the known edge enhancement techniques, the resultant waveform has an undershoot c1 and an overshoot c2, like shown in (c) of FIG. 10. If the input video signal carries a sharp image, for example, an OSD letter, the undershoot c1 and overshoot c2 are applied the edge portions of the letter, thus causing decrease in image quality, as already discussed.

In contrast, according to the embodiment of the present invention, when the input video signal illustrated in (a) FIG. 10 having the rising edge is supplied to the delay circuits $211_1$ to $211_4$, signal levels at four pixels adjacent to one another in the horizontal scanning direction are detected in step S41. Obtained next in step S42 is an absolute difference (an absolute value of a difference) in signal level between two adjacent pixels of each pixel pair among the four pixels.

In detail, detected in step S41 are signal levels p1, p2, p3 and p4 at the four pixels adjacent to one another in the horizontal direction, as illustrated in (a) FIG. 10.

At the moment at which the signal level p1 is output from the delay circuit $211_4$, differences in signal level (p1−p2), (p2−p3) and (p3−p4) are output from the subtractors $212_1$, $212_2$ and $212_3$, respectively.

Output signals of the subtractors $212_1$, $212_2$ and $212_3$ are processed by the absolute value output circuits $213_1$, $213_2$, and $213_3$, respectively. Output from the circuits $213_1$, $213_2$, and $213_3$ are absolute-difference signals p11, p12 and p13, respectively, such as illustrated in (d) of FIG. 10. When the absolute-difference signal in (d) of FIG. 10 is output from the circuit $213_2$, the signals output from the circuits $213_1$ and $213_3$ are identical to that in (d) of FIG. 10 but shifted by one pixel to the left and the right, respectively.

The absolute-difference signals p11, p12 and p13 are supplied to the comparators $214_1$, $214_2$, and $214_3$, respectively. Each absolute difference (AB) is compared with the two reference values TH1 and TH2 (TH2>TH1), as illustrated in (e) of FIG. 10. Each comparator outputs: a signal of value "0" when the level (AB) of the absolute-difference signal is smaller than TH1; a signal of value "1" when equal to or larger than TH1 but smaller than TH2; and a signal of value "2" when equal to or larger than TH2.

The reference value TH1 is used for detecting small-amplitude high-frequency components of a video signal, such as, noise components. Accurate detection of a video signal, like an OSD signal with almost no noises and an almost constant signal level is achieved with a well-adjusted value TH1. The reference value TH2 is used for detecting edge portions of a video signal.

The comparators $214_1$, $214_2$, and $214_3$ compare the reference value TH1 and the input absolute-difference signals p11, p12 and p13, respectively, to determine whether the absolute values (AB) of the signals p11, p12 and p13 are smaller than TH1, respectively, in step S43. If YES or AB<TH1, each comparator outputs a signal of "0" in step S44. On the contrary, if NO or AB≧TH1, each comparator compares AB with the reference value TH2 to determine whether AB is smaller than TH2 in step S45. If YES or TH1≦AB<TH2, each comparator outputs a signal of "1" in step S46. On the contrary, if NO or AB≧TH2, each comparator outputs a signal of "2" in step S47.

Suppose that the signal levels p1 to p4 at the four pixels have the relationships p1=p2, p3=p4 and p2>p3 in (a) of FIG. 10.

The absolute-difference signal p12 in (d) of FIG. 10 is produced based on the steep rising edge of the input video signal illustrated in (a) of FIG. 10. Moreover, the signal p12 has the larger absolute value than the reference value TH2, as illustrated in (e) of FIG. 10. Thus, the comparator $214_2$ outputs a signal of "2" in step S47.

In contrast, the absolute-difference signals p11 and p13 have the absolute value "0" smaller than the reference value TH1, as illustrated in (e) of FIG. 10. Thus, the comparators $214_1$ and $214_3$ output a signal of "0" in step S44.

The output signals of the comparators $214_1$, $214_2$ and $214_3$ are supplied in parallel to the pattern detector 215. The detector 215 determines whether the signals have a pattern of "0", "2" and "0", respectively, in step S48. If YES the detector 215 outputs a control signal having an "High" level for a period of transferring the input video signal by the total of four pixels that are a first pixel, a second pixel, a third pixel, and a fourth pixel located in order and adjacent to one another in the horizontal scanning direction, the absolute-difference signal of "2" being gained from the second and third pixels. On the contrary, if NO in step S48, the detector 215 outputs another control signal having a "Low" level.

In the case of the video signal having the signal levels p1 to p4 illustrated in (a) of FIG. 10, The comparators $214_1$, $214_2$ and $214_3$ output the signals having a pattern of "0", "2" and "0", respectively. Then, the pattern detector 21 detects the pattern of "0", "2" and "0" and outputs the control signal having the "High" level for a period of transferring the total of four pixels with the signal levels p1, p2, p3 and p4, respectively, located in order and adjacent to one another in the horizontal scanning direction, the absolute-difference signal p12 of "2" being gained at the comparator $214_2$ based on the middle two pixels with the signal levels p2 and p3.

Then, in FIG. 8, the pattern detector 21 supplies the control signal having the "High" level to the amplifier 23. Or, it supplies the other control signal having the "Low" level to the amplifier 23 when it does not detect the pattern of "0", "2" and "0".

When the control signal having the "High" level is supplied, the amplifier 23 is turned off so that it does not output to the adder 24 the edge enhancing component supplied from the HPF 22. In contrast, when the control signal having the "Low" level is supplied, the amplifier 23 is turned on so that it adjusts the amplitude of the edge enhancing component and supplies it to the adder 24. The amplitude-adjusted edge enhancing component is then added to the input video signal.

When the amplitude-adjusted edge enhancing component is supplied, the adder 24 adds it to the input video signal and outputs an edge-enhanced video signal, such as illustrated in (g) of FIG. 10.

The video signal illustrated in (g) of FIG. 10 has almost the same waveform as the input video signal illustrated in (a) of FIG. 10. It has a sharp edge portion with no undershoot c1 and overshoot c2, such as illustrated in (c) of FIG. 10, even if it is an OSD signal and subjected to the edge enhancing processing.

Moreover, the embodiment disclosed above offers more precise edge enhancing processing than the known processing.

In detail, the known processing cancels the overshoot to be generated near a target pixel whenever the second-order differential signal produced based on the target pixel exceeds the reference level. This inevitably cancels the overshoot at a video signal portion to which edge enhancement should be applied with the overshoot, thus lowering the sharpness of image.

On the contrary, second-order differential signals are gained for a set of three pixels located adjacent to one another in the embodiment disclosed above, thus enabling cancellation of the overshoot or undershoot only at steep edge portions of a video signal.

In the embodiment above, the target pixels at which edge enhancement is cancelled are four pixels located adjacent to one another in the horizontal scanning direction, with the pattern of "0", "2" and "0" being detected therefrom. The number of such target pixels is, however, not limited to four but any number of N (an even number of at least four) depending on the filter characteristics with which edge enhancing components are produced. Moreover, the period for which edge enhancement is cancelled becomes longer as the number of filter taps (the number of the delay circuits in FIG. 9) is larger.

Figure 11:
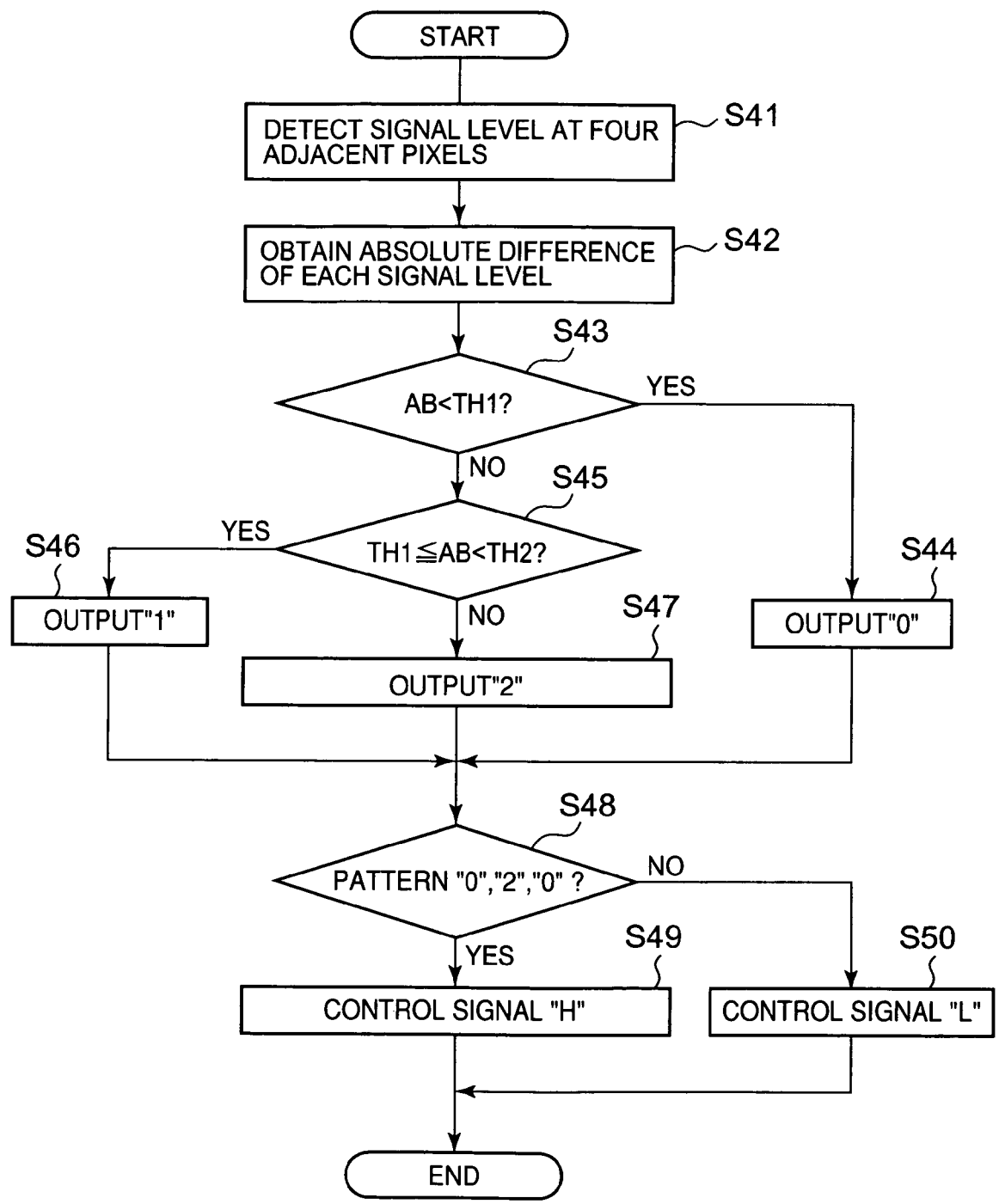
FIG. 11 shows a flow chart explaining the operation of an edge recognizer in the edge enhancement apparatus according to the present invention.

Furthermore, in FIG. 11, each of the comparators $214_1$, $214_2$, and $214_3$ outputs the signal of "0", "1" or "2" in step S44, S46 or S47, and the pattern detector 215 determines in step S48 whether the output signals of the comparators have the pattern of "0", "2" and "0" for the four pixels.

However, not only the values "0", "1" and "2", each comparator (the number of comparators being N–1 for the N number of pixels) may output any three different values, a first value, a second value and a third value. In other words, each comparator may output: a signal of the first value in step S44 if AB<TH1; a signal of the second value in step S46 if TH1≦AB<TH2; and a signal of the third value in step S47 if AB≧TH2.

Then, the pattern detector 215 determines in step S48 whether the output signals of the (N–1) number of comparators have at least the pattern of "the first value", "the third value" and "the first value" aligned in order when the values of the output signals of the (N–1) number of comparators are aligned in the horizontal scanning direction in which the N number of pixels are aligned.

The functions of the edge enhancement apparatus shown in FIG. 8, particularly, the pattern recognizer 21 shown in FIGS. 9 and 11 are achieved with software programs (edge enhancement programs). The programs can be installed in a computer from a storage medium or downloaded via a communications network, or preinstalled in visual equipment as firmware.

As disclosed above in detail, according to the present invention, a video signal having an edge portion and a video signal having no edge portions are processed in different ways before supplied for edge enhancement.

When an input video signal has an edge portion, its high-frequency components are attenuated, before supplied to the edge enhancer, through a low-pass filter that exhibits filter characteristics that matches the steepness of the edge portion. In contrast, when an input video signal has no edge portions, it is directly supplied to the edge enhancer.

Therefore, when the input video signal has a sharp edge portion, for example, an OSD signal having a step-like edge portion, it is subjected to edge enhancement after its high-frequency components are attenuated through a low-pass filter that exhibits filter characteristics that matches the step-like edge portion. Thus, a user can enjoy a sharp edge-enhanced OSD on screen. Not only that, the user can enjoy sharp edge-enhanced natural images because these images with no such step-like edge portion are directly subjected to edge enhancement with no such filtering process.

Moreover, as disclosed above in detail, according to the present invention, a high-definition low-noise video signal having steep edge portions is processed in a way that edge enhancement is applied to video signal components with no such steep edge portions while edge enhancing components are not added to the steep edge portions, thus an edge-enhanced video signal being output with no overshoot or undershoot. Thus, a user can enjoy sharp edge-enhanced OSDs and natural images on screen.

Moreover, according to the present invention, detection of a steep edge portion of a video signal at pixels of four or more adjacent to one another in the horizontal scanning direction offers more precise edge enhancement with no overshoot or undershoot than the known edge enhancement techniques in which edge enhancement is controlled per pixel.

What is claimed is:

1. A video signal processing apparatus for edge enhancement comprising:
    a signal level detector to detect signal levels of an input video signal at an N number of pixels located adjacent to one another in a specific scanning direction, N being an even number of four or larger;
    an absolute value producer to obtain a difference between the signal levels and produce an absolute difference that is an absolute value of the difference at each pair of adjacent two pixels among the N number of pixels, thus obtaining an (N–1) number of absolute differences;
    a nonlinear arithmetic processor to apply nonlinear arithmetic processing to a particular one absolute difference among the (N–1) number of absolute differences to subtract the particular one absolute difference from a predetermined initial value to obtain a subtracted value, and to obtain an absolute value of the subtracted value, the absolute value of the subtracted value being set to a predetermined value if equal to or lower than the predetermined value, the particular one absolute difference being obtained from a pixel pair of two adjacent pixels located in the middle of the N number of pixels aligned in the specific scanning direction;
    an adder to add the absolute value of the subtracted value subjected to the nonlinear arithmetic processing and an (N–2) number of absolute differences among the (N–1) number of absolute differences, the (N–2) number of absolute differences being not subjected to the nonlinear arithmetic processing, thus obtaining an evaluation function value;
    a plurality of low-pass filters having different filter characteristics for applying filtering processing to the input video signal, thus outputting video signals having high-frequency components attenuated depending on the different filter characteristics; and
    a selector to select the input video signal with no filtering processing applied for the edge enhancement if the evaluation function value is larger than a reference value whereas one of the video signals output from the low-pass filters for the edge enhancement if the evaluation function value is equal to or smaller than the reference value, the smaller the evaluation function value, selected being one of the video signals having the high-frequency components attenuated more.

2. The video signal processing apparatus according to claim 1 wherein the signal level detector includes the N number of delay circuits having at least a first, a second, a third, and a fourth delay circuit connected to one another in series in order in a horizontal scanning direction in which the N number of pixels are located adjacent to one another, each delaying the input video signal for a period required for transferring the video signal by one pixel in the horizontal scanning direction.

3. The video signal processing apparatus according to claim 2 wherein the absolute value producer includes the (N–1) number of subtractors having at least a first, a second, and a third subtractor connected to the delay circuits so that an output video signal of the third delay circuit is subtracted from an output video signal of the fourth delay circuit at the third subtractor, an output video signal of the second delay circuit is subtracted from the output video signal of the third delay circuit at the second subtractor, and an output video signal of the first delay circuit is subtracted from the output video signal of the second delay circuit.

4. The video signal processing apparatus according to claim 1 wherein the signal level detector includes the N number of delay circuits having at least a first, a second, a third, and a fourth delay circuit connected to one another in series in order in a vertical scanning direction in which the N number of pixels are located adjacent to one another, each delaying the input video signal for a period required for transferring the video signal by one line of pixels located adjacent to one another in a horizontal scanning direction.

5. The video signal processing apparatus according to claim 4 wherein the absolute value producer includes the (N−1) number of subtractors having at least a first, a second, and a third subtractor connected to the delay circuits so that an output video signal of the third delay circuit is subtracted from an output video signal of the fourth delay circuit at the third subtractor, an output video signal of the second delay circuit is subtracted from the output video signal of the third delay circuit at the second subtractor, and an output video signal of the first delay circuit is subtracted from the output video signal of the second delay circuit.

6. An edge enhancement apparatus comprising:
a signal level detector to detect signal levels of an input video signal at an N number of pixels located adjacent to one another in a horizontal scanning direction, N being an even number of four or larger;
an absolute value producer to obtain a difference between the signal levels and produce an absolute difference that is an absolute value of the difference at each pair of adjacent two pixels among the N number of pixels, thus obtaining an (N−1) number of absolute differences;
a comparator to compare each of the (N−1) number of absolute differences with a first reference value and a second reference value larger than the first reference value, and output a first value if each absolute difference is smaller than the first reference value, a second value if each absolute difference is equal to or larger than the first reference value but smaller than the second reference value, and a third value if each absolute difference is equal to or larger than the second reference value, the first, second and third values being different from one another;
a pattern recognizer to detect whether output values of the comparator for the (N−1) number of absolute differences have at least a pattern of "the first value", "the third value" and "the first value" aligned in order when the output values are aligned in the horizontal scanning direction in which the N number of pixels are aligned, thus outputting a first control signal when the output values are recognized as having the pattern whereas a second control signal different from the first control signal when the output values are recognized as not having the pattern, the first or the second control signal being output for a period of transferring the input video signal by the N number of pixels; and
an edge enhancer, responsive to the first or the second control signal, to produce an edge enhancing component based on the input video signal and add the edge enhancing component to the input video signal, thus outputting an edge-enhanced video signal when the first control signal is supplied whereas outputting the input video signal without adding the edge enhancing component when the second control signal is supplied.

7. The edge enhancement apparatus according to claim 6 wherein the signal level detector includes the N number of delay circuits having at least a first, a second, a third, and a fourth delay circuit connected to one another in series in order in the horizontal scanning direction, each delaying the input video signal for a period required for transferring the video signal by one pixel of the N number of pixels located adjacent to one another in the horizontal scanning direction.

8. The edge enhancement apparatus according to claim 7 wherein the absolute value producer includes the (N−1) number of subtractors having at least a first, a second, and a third subtractor connected to the delay circuits so that an output video signal of the third delay circuit is subtracted from an output video signal of the fourth delay circuit at the third subtractor, an output video signal of the second delay circuit is subtracted from the output video signal of the third delay circuit at the second subtractor, and an output video signal of the first delay circuit is subtracted from the output video signal of the second delay circuit.

9. A video signal processing method for edge enhancement comprising the steps of:
detecting signal levels of an input video signal at an N number of pixels located adjacent to one another in a specific scanning direction, N being an even number of four or larger;
obtaining a difference between the signal levels and producing an absolute difference that is an absolute value of the difference at each pair of adjacent two pixels among the N number of pixels, to obtain an (N−1) number of absolute differences;
applying nonlinear arithmetic processing to a particular one absolute difference among the (N−1) number of absolute differences to subtract the particular one absolute difference from a predetermined initial value to obtain a subtracted value, and to obtain an absolute value of the subtracted value, the absolute value of the subtracted value being set to a predetermined value if equal to or lower than the predetermined value, the particular one absolute difference being obtained from a pixel pair of two adjacent pixels located in the middle of the N number of pixels aligned in the specific scanning direction;
adding the absolute value of the subtracted value subjected to the nonlinear arithmetic processing and an (N−2) number of absolute differences among the (N−1) number of absolute differences, the (N−2) number of absolute differences being not subjected to the nonlinear arithmetic processing, to obtain an evaluation function value;
applying low-pass filtering processing to the input video signal with different filter characteristics to obtain video signals having high-frequency components attenuated depending on the different filter characteristics; and
selecting the input video signal with no low-pass filtering processing applied for the edge enhancement if the evaluation function value is larger than a reference value whereas one of the video signals applied the low-pass filtering processing for the edge enhancement if the evaluation function value is equal to or smaller than the reference value, the smaller the evaluation function value, selected being one of the video signals having the high-frequency components attenuated more.

10. The video signal processing method according to claim 9 wherein the signal level detecting step includes the step of delaying the input video signal by N times each time for a period required for transferring the video signal by one pixel in a horizontal scanning direction in which the N number of pixels are located adjacent to one another.

11. The video signal processing method according to claim 9 wherein the signal level detecting step or includes the step of delaying the input video signal by N times each time for a period required for transferring the video signal by one line of pixels located adjacent to one another in a horizontal scanning direction in which the N number of pixels are located adjacent to one another.

12. An edge enhancement method comprising the steps of:

detecting signal levels of an input video signal at an N number of pixels located adjacent to one another in a horizontal scanning direction, N being an even number of four or larger;

obtaining a difference between the signal levels and producing an absolute difference that is an absolute value of the difference at each pair of adjacent two pixels among the N number of pixels, to obtain an (N−1) number of absolute differences;

comparing each of the (N−1) number of absolute differences with a first reference value and a second reference value larger than the first reference value, and outputting a first value if each absolute difference is smaller than the first reference value, a second value if each absolute difference is equal to or larger than the first reference value but smaller than the second reference value, and a third value if each absolute difference is equal to or larger than the second reference value, the first, second and third values being different from one another;

detecting whether output values of the comparison for the (N−1) number of absolute differences have at least a pattern of "the first value", "the third value" and "the first value" aligned in order when the output values are aligned in the horizontal scanning direction in which the N number of pixels are aligned, to output a first control signal when the output values are recognized as having the pattern whereas a second control signal different from the first control signal when the output values are recognized as not having the pattern, the first or the second control signal being output for a period of transferring the input video signal by the N number of pixels; and producing an edge enhancing component based on the input video signal and adding the edge enhancing component to the input video signal, to obtain an edge-enhanced video signal when the first control signal is supplied whereas obtain the input video signal without adding the edge enhancing component when the second control signal is supplied.

13. The edge enhancement method according to claim 12 wherein the signal level detecting step includes the step of delaying the input video signal by N times each time for a period required for transferring the video signal by one pixel in the horizontal scanning direction.

\* \* \* \* \*